United States Patent
Whiteside (12)

(10) Patent No.: US 6,539,976 B1
(45) Date of Patent: Apr. 1, 2003

(54) WATER HAMMER ARRESTER

(75) Inventor: Michael J. Whiteside, Toronto (CA)

(73) Assignee: Mifab, Inc., Amherst, NY (US)

(\*) Notice: Subject to any disclaimer, the term of this patent is extended or adjusted under 35 U.S.C. 154(b) by 0 days.

(21) Appl. No.: 10/099,419

(22) Filed: Mar. 15, 2002

(51) Int. Cl.[7] ............................................. F16L 55/04
(52) U.S. Cl. ................................... 138/31; 138/30
(58) Field of Search ........................ 138/31, 26, 30

(56) References Cited

U.S. PATENT DOCUMENTS

| 2,261,948 A | | 11/1941 | Beach ..................... 181/233 |
| RE24,223 E | * | 9/1956 | Ford et al. .................. 138/31 |
| 2,838,073 A | | 6/1958 | Mattia et al. ................. 138/30 |
| 2,873,763 A | * | 2/1959 | Mercier ...................... 138/31 |
| 3,158,180 A | * | 11/1964 | Greer ......................... 138/31 |
| 3,613,734 A | * | 10/1971 | Elmer ......................... 138/31 |
| 3,633,627 A | * | 1/1972 | Perrott et al. ................ 138/31 |
| 4,749,071 A | | 6/1988 | Taylor .................... 138/31 X |
| 4,819,698 A | * | 4/1989 | Ismert ........................ 138/26 |
| 5,385,172 A | * | 1/1995 | Perrott et al. ................ 138/26 |
| 6,095,195 A | * | 8/2000 | Park et al. ................... 138/30 |

\* cited by examiner

*Primary Examiner*—Patrick Brinson
(74) *Attorney, Agent, or Firm*—Hodgson Russ LLP

(57) ABSTRACT

A water hammer arrestor having an insert molded plastic body with a metal attachment at one end to install to the supply line. A piston disposed inside the bore of the plastic body includes a flexible skirt that faces the water supply. The skirt includes a sharp edge that provides a scraping/cleaning action.

15 Claims, 5 Drawing Sheets

WATER HAMMER ARRESTER

FIELD OF INVENTION

The present invention relates to water hammer arresters. Water hammer arresters are devices for preventing the development of water hammer in conduits conveying water under pressure and under conditions of interrupted flow.

BACKGROUND OF THE INVENTION

The phenomenon of water hammer is caused by the development of hydraulic shock waves generated by the sudden stopping of fluid flow within the confines of a conduit system carrying water under pressure. This condition results from the rapid closing of positive valves incorporated within the system. In addition to the production of unpleasant noise effects, fluid hammer, if allowed to persist for any length of time, will result in broken conduits and damage to other components of the conduit system.

Various types of water hammer arresters are known in the prior art. Some devices include expandable bellows or diaphragms that absorb the shock. Another type of water hammer arrester involves the application of a piston working against the pressure developed by a compressed gas chamber. When the water hammer arrester is properly installed with its inlet orifice facing the pressurized water supply line, it must reduce spike pressures as high as 1,000 p.s.i. or more (in large pipe diameters) to 150 p.s.i. or less. Nevertheless, an echo effect still results from the dampening effect of the initial spike shock.

Conventional piston-type water hammer arresters are typically manufactured from copper tubing with solder attached brass/copper fittings that provide either pipe thread or sweat solder fittings in order to install into the supply lines. They utilize either brass or plastic pistons with a number (2–3) of rubber o-ring seals. Some problems exist with this particular design. In order to reduce the echo effect it is necessary to utilize acoustical/fluid directional methods to break up shock wave patterns. For example, there have been some experiments with conical interiors of the body and limiting orifices to improve and reduce echo.

Long term life conditions of this design of water hammer arrester are also a concern. Hard deposits of iron, calcium, and or sand, which exist in all municipal water, infiltrate the rubber o-rings due to a clearance gap much larger than these contaminant particle sizes. When this infiltration occurs, the hard deposits are imbedded into the o-rings, especially due to a silicone grease requirement used to lubricate the o-rings. This imbedding of deposits causes scoring of the interior wall of the copper tubing and degradation of the o-rings. In time, the pressurized chamber (normally 60 p.s.i.) behind the piston leaks and is absorbed into the water supply. The resulting loss of pressure renders the water hammer arrester ineffective.

Another problem with conventional water hammer arresters is denting of the thin-walled copper body. During installation, when a plumbing contractor may have personnel installing hundreds of water hammer arresters, fatigue occurs and heavy wrenches required for the installation work are dropped and may strike the thin-walled copper body causing a dent that may prevent piston movement.

There have been water hammer arresters formed entirely out of plastic. However, the pipe thread connections may easily cross thread or fracture during installation.

What is needed is a water hammer arrester that will reduce echo, provide superior dent resistance, improve long term life and provide a high strength non-corrosive metallic connection to the supply lines.

SUMMARY OF THE INVENTION

The present invention meets the above-described need by providing a water hammer arrestor having an insert molded plastic body with a metal attachment at one end to install to the supply line. A piston disposed inside the bore of the plastic body includes a flexible skirt that faces the water supply. The skirt includes a sharp edge that provides a scraping/cleaning action.

BRIEF DESCRIPTION OF THE DRAWINGS

The invention is illustrated in the drawings in which like reference characters designate the same or similar parts throughout the figures of which.

DETAILED DESCRIPTION

Figure 1:
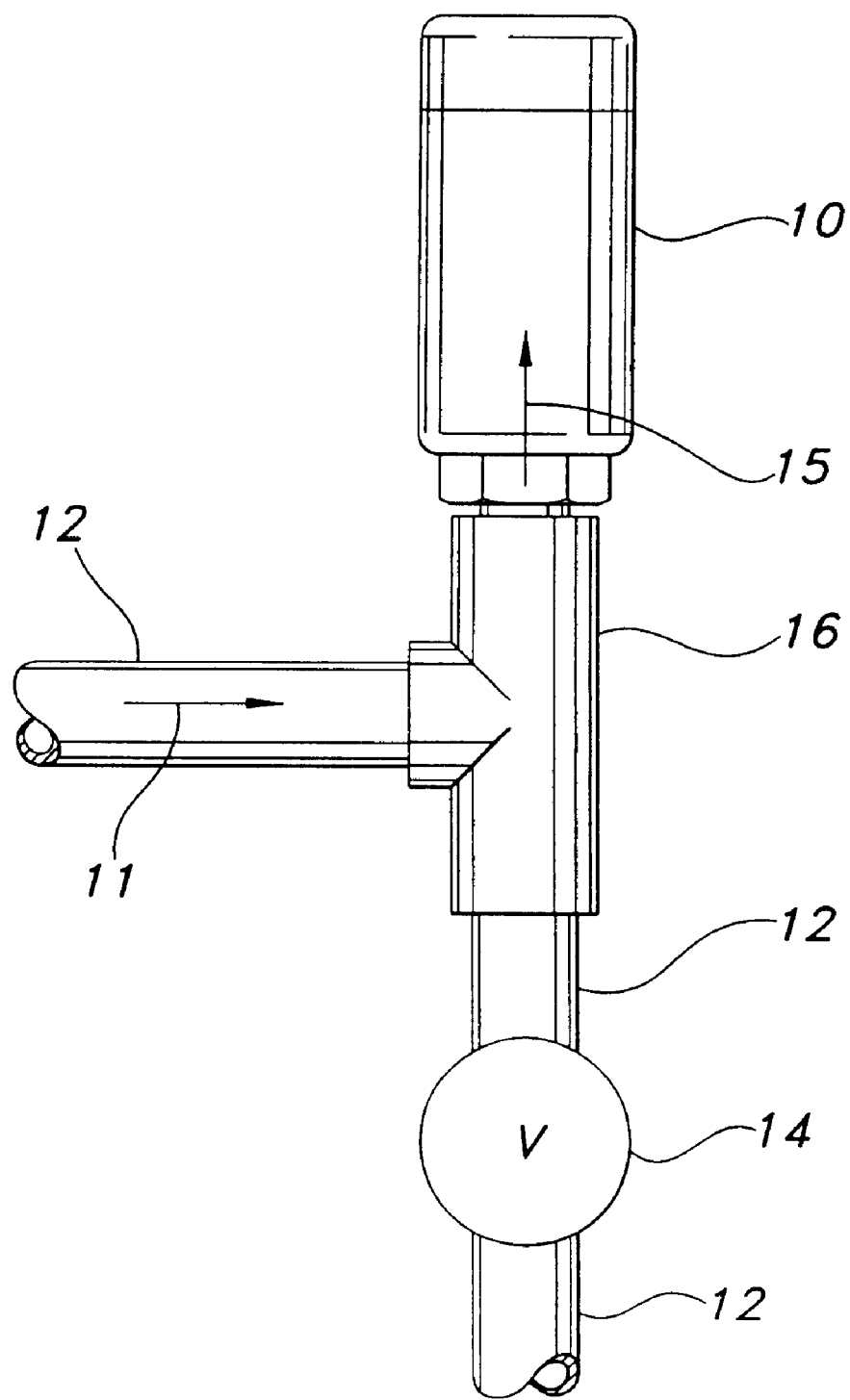
FIG. 1 is a fragmentary view in side elevation of a piping system including a water hammer arrester.

The presently described water hammer arrester is indicated generally at 10, FIG. 1. It is adaptable for installation in fluid conveying systems wherever there is a likelihood of the development of fluid hammer. Such a situation is present in the illustrated example where there is fluid flow in the direction of arrow 11 through a conduit system 12 including a valve 14. As is well known, closing the valve 14 suddenly and thus arresting the flow of the fluid through the conduit system 12 may result in setting up water hammer conditions.

In general, the water hammer arrester 10 should be placed as near the source of shock as possible. It also should be installed in such a manner that there is an unobstructed shock path (indicated by arrow 15) to the arrester 10. Accordingly, in FIG. 1 the arrester may be included in the conduit system 12 simply by inserting a tee 16 to which the arrester 10 is coupled.

Figure 2:
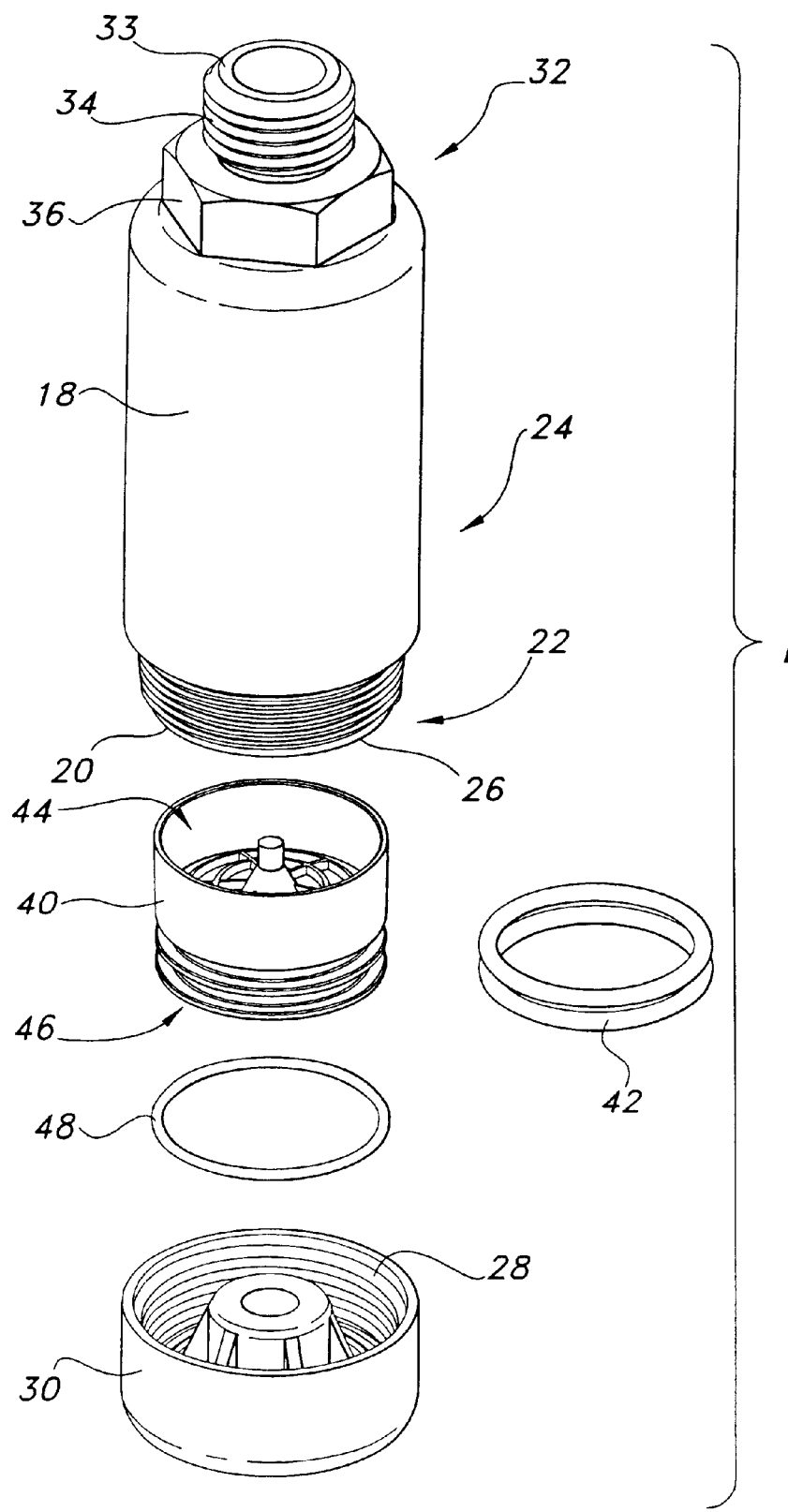
FIG. 2 is an exploded perspective view of the water hammer arrester of the present invention.

Turning to FIG. 2, the water hammer arrester 10 is formed from a hollow cylindrical body 18 having a round opening 20 at a first end 22. The outside surface 24 of the body 18 has a set of external threads 26 disposed thereon. The threads 26 engage with a set of internal threads 28 disposed on end cap 30.

At the opposite end 32 of the body 18, a metal fitting 33 having a set of external threads 34 is attached to and extends from the body 18. A set of wrench flats 36 are disposed adjacent to the fitting 33. The fitting 33 may be formed out of any suitable metal including brass. The wrench flats 36 provide for installing the arrester 10 into a conduit system 12 by means of engagement of the threads 34 on the fitting 33 with a cooperating set of internal threads in the tee 16 or other member of the conduit system 12.

The body 18 is preferably formed out of a suitable rigid plastic material. The metal fitting 33 may be attached to the body 18 during the molding process. As known to those of ordinary skill in the art of plastic molding, the metal fitting 33 may be placed inside a mold and the plastic may be molded onto the fitting 33 in interlocking fashion. The attachment of the fitting 33 to the body 18 is described in greater detail below.

A piston 40 is sized to fit inside the hollow body 18 and to slide relative to the body 18 in response to pressure changes. The piston 40 is provided with at least one o-ring 42 to provide a seal between the piston and the inner walls of the body 18. A first side 44 of the piston 40 faces the flow of the water inside the conduit system 12. The surface of the piston 40 facing the water supply can be textured, ribbed, and or spiked to fragmentize the fluid spike in order to reduce echo. A second side 46 of the piston 40 is exposed to pressure resulting from a compressed gas such as air disposed inside the pressurized chamber created inside the body 18. The pressurized chamber will be described in greater detail hereinafter but the pressure is typically around 60 p.s.i.

A gasket 48 seals the connection between the body 18 and the end cap 30.

Figure 3:
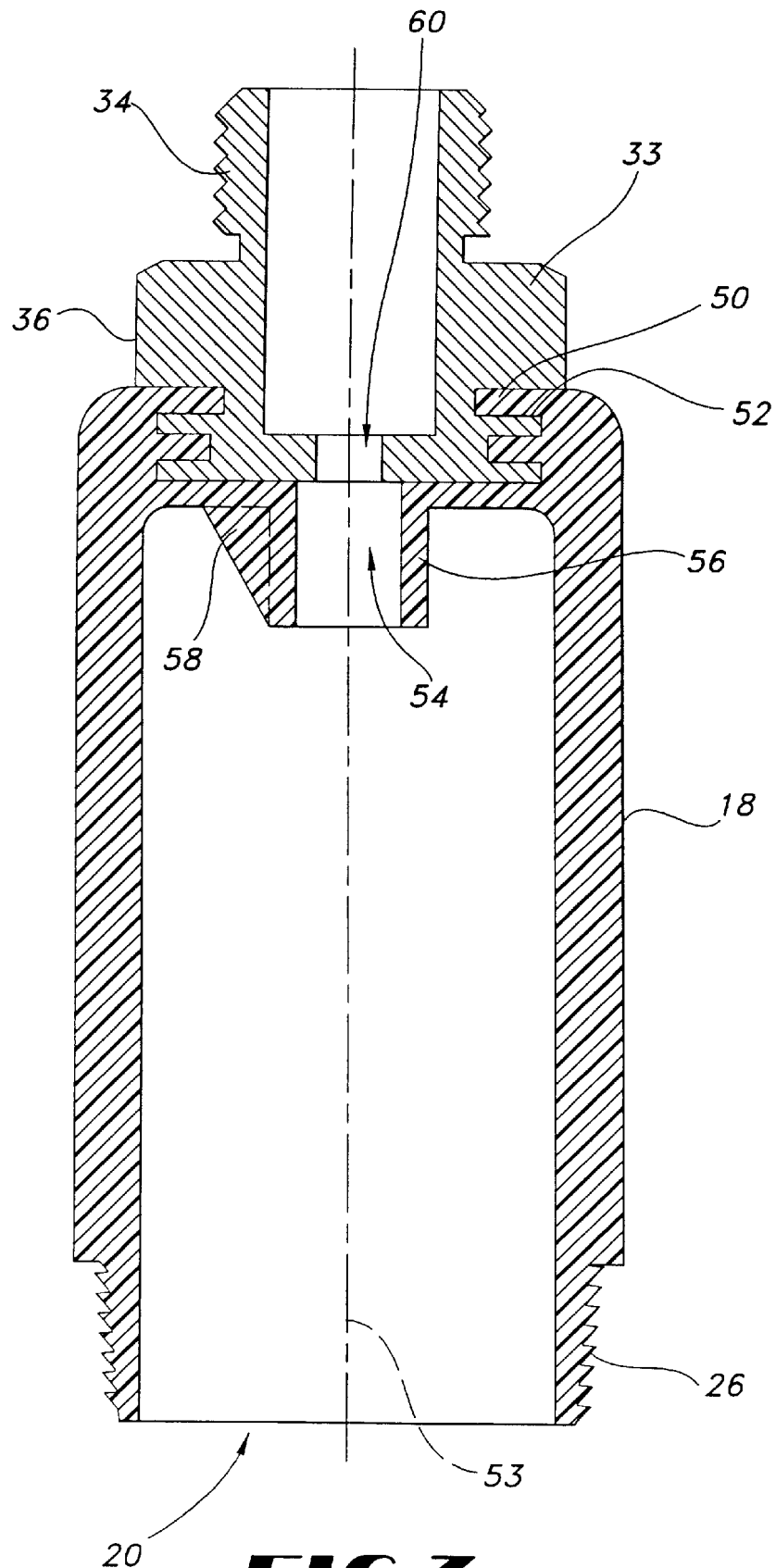
FIG. 3 is a cutaway front elevational view of the body of the water hammer arrester.

Turning to FIG. 3, a cutaway view of the body 18 and the fitting 33 illustrates the interlocking connection. As shown, the metal fitting 33 has a set of recesses 50 disposed around the circumference of the fitting 33. The recesses 50 receive plastic material from the body 18 during the molding process such that an interlock is formed. Finger-like projections 52 from the molded body 18 extend into the recesses 50 around the entire circumference of the fitting 33. As a result of the molding, a mechanical interlock between the body 18 and the fitting 33 is formed. Depending on the materials and the molding process it may be possible to also form a chemical bond between the materials.

As shown, the body 18 and the fitting 33 are symmetrical about a longitudinal axis 53. The body 18 has a centrally located aperture 54. Inwardly extending cylindrical wall 56 surrounds aperture 54. The cylindrical wall 56 is supported by a plurality of gussets 58 disposed around the periphery of the wall 56.

The fitting 33 also has a centrally located aperture 60. Aperture 60 is smaller than the aperture 54 in the body 18.

Figure 4:
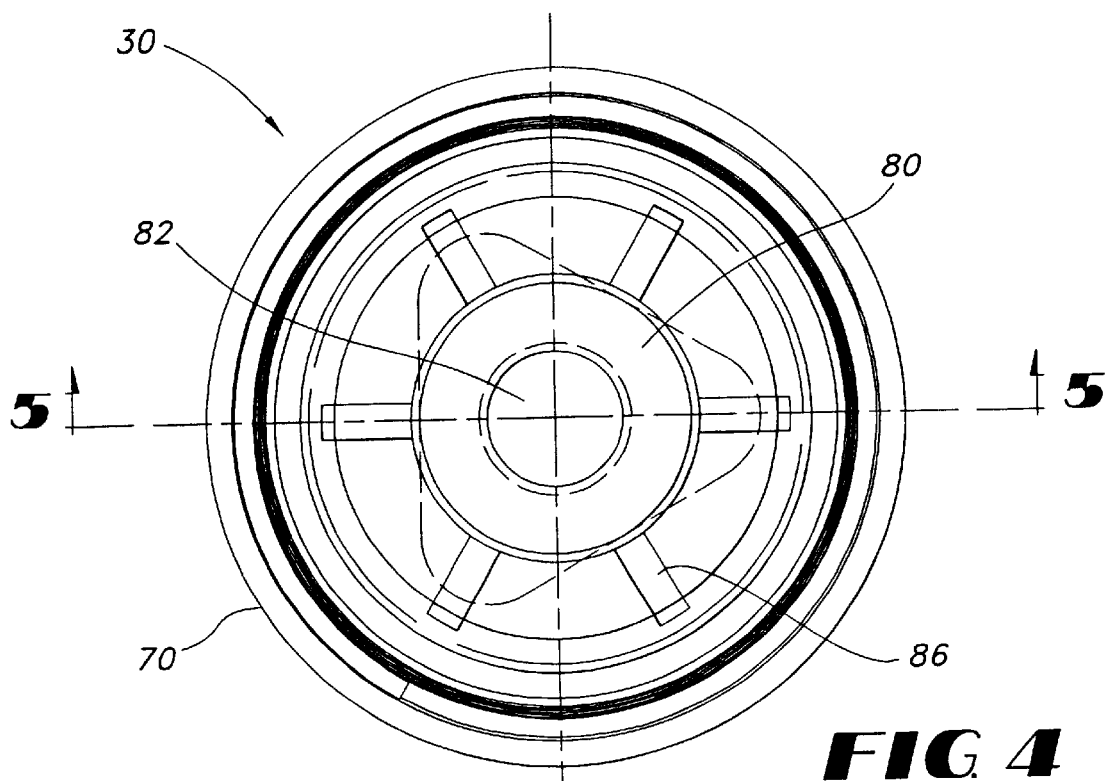
FIG. 4 is a top plan view of the end cap.
Figure 5:
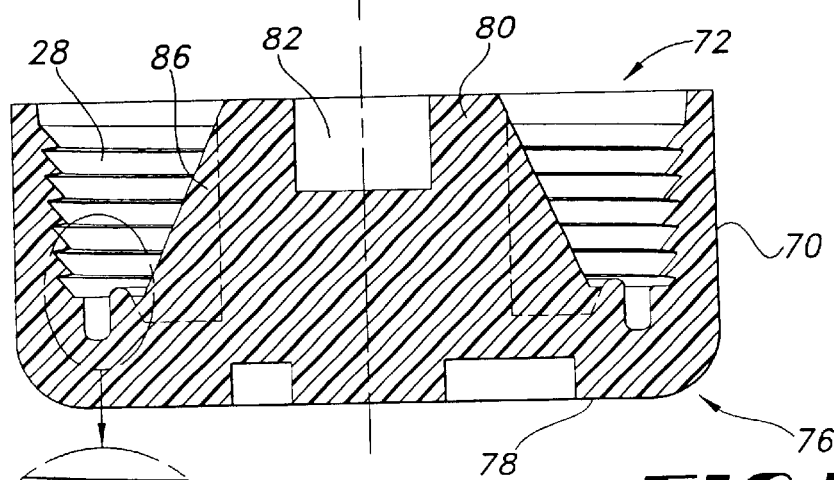
FIG. 5 is a cross sectional view taken along lines 5—5 of FIG. 4.
Figure 6:
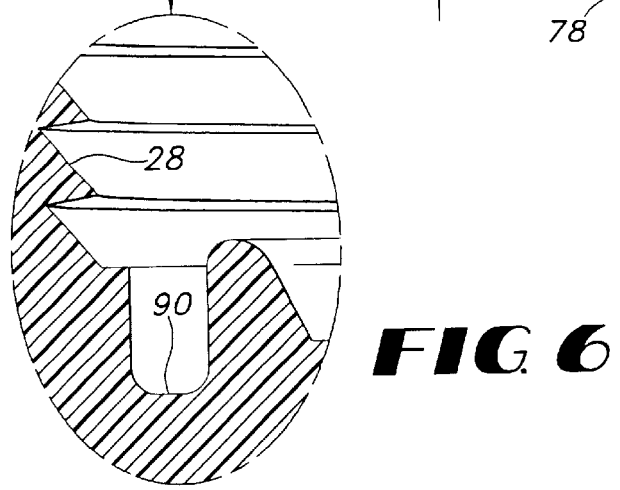
FIG. 6 is a partial detailed view of the end cap.

Referring to FIGS. 4–6, the end cap 30 is shown in greater detail. The end cap 30 has a cylindrical side wall 70 that terminates in an opening 72 at a first end 74. At the opposite end 76, the side wall 70 meets a bottom wall 78. As shown in FIG. 4, the end cap 30 has a centrally disposed cylindrical member 80 with a central aperture 82. The cylindrical member 80 is supported around its perimeter by a plurality of gussets 86. The cylindrical member 80 provides high strength and a stop for the piston 40. This member 80 also provides a place for drilling and pipe tapping in order to install an external check valve which can be used in high performance applications requiring field pressurizing of air or nitrogen gas.

As shown in FIG. 5, the cylindrical member 80 has solid walls supported by the gussets 86 which are triangular in shape. The internal threads 28 that engage with the external threads 26 on the outside of body 18 are also shown.

In FIG. 6, the seat 90 for gasket 48 is shown. At the bottom of the threads 28, the seat 90 is formed around the entire perimeter of the end cap 30. The gasket 48 is positioned in the seat 90 when the end cap 30 is attached to the body 18. When the cap 30 is secured onto the end of the body 18 by means of the cooperating threads 26 and 28, the bottom edge of the body 18 engages with the gasket 48 to form a seal. This arrangement allows for installation of the piston and o-rings from the open end of the plastic body. While assembling the threaded end cap 30, pressurized air or nitrogen gas can backcharge the gas chamber behind the piston 40 to various pressure levels as dictated by particular applications.

Figure 7:
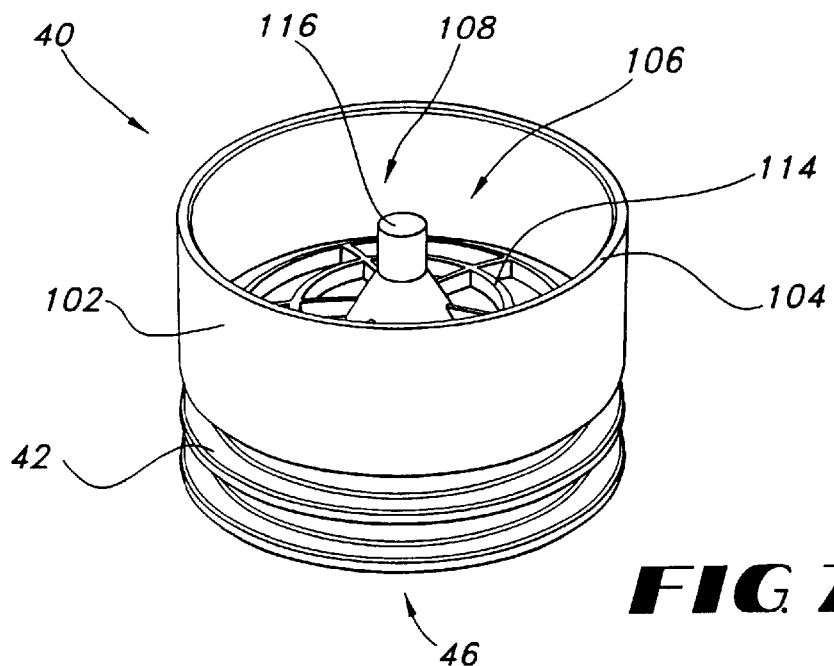
FIG. 7 is a perspective view of the piston.
Figure 8:
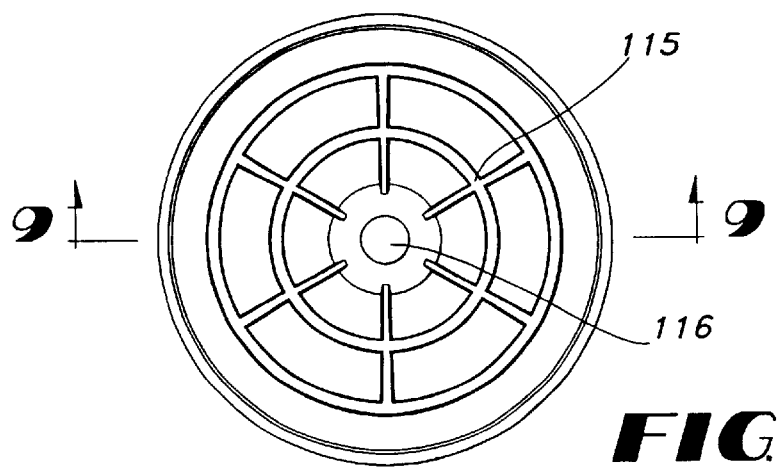
FIG. 8 is a top plan view of the piston.
Figure 9:
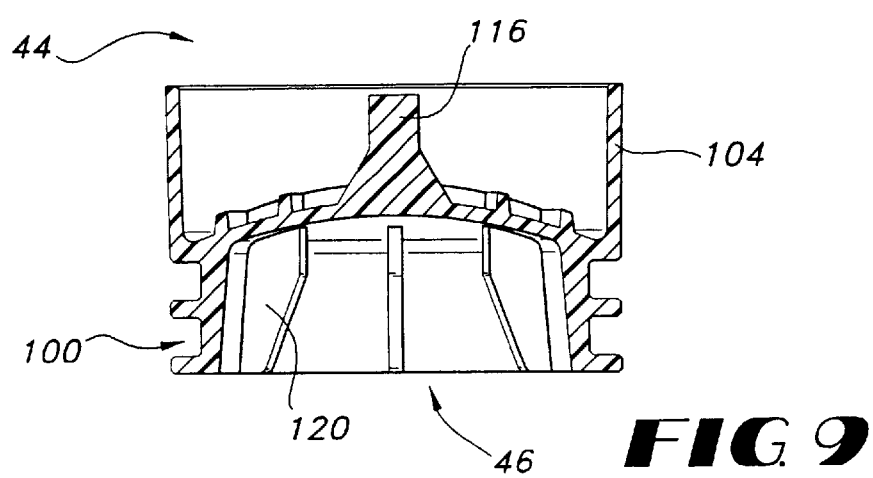
FIG. 9 is a cross-sectional view taken along lines 9—9 of FIG. 8.

Turning to FIG. 7, the piston 40 is preferably formed out of a plastic material. At least one O-ring 42 is positioned in a groove 100 formed in the outside wall 102 of the piston 40. As shown, there are two O-rings 42 disposed in a pair of grooves 100 (FIG. 9). The piston 40 includes a side wall 104 that terminates at an opening 106 at a first end 108. The side wall 104 is angled outwardly such that the diameter at the first end 44 is larger than the diameter at the second end 46. At the first end 44, the sidewall 104 has a flexible skirt 105 with a sharp edge. This design recirculates deposits and hard particles back into the water line. At the opposite end 110, there is a second opening 112. A wall 114 is disposed across a midportion of the piston 40. The wall divides the piston into a first section and a second section. The first section faces the water side of the arrester 10 when the arrester 10 is installed in a conduit system 12. The wall 114 defines a first water chamber when the arrester 10 is absorbing a shock wave resulting from water hammer created in the conduit system 12. The second section faces the end cap 30 when the arrester 10 is installed. The second section created by the wall 114 defines a second chamber for holding compressed gas such as air.

As shown in FIG. 7, a projecting member 116 extends from the center of the wall 114 on the water side of the arrester 10. The projecting member 116 fits into the aperture 60 in the fitting 33. A web structure 115 adds strength and rigidity to the wall 114. On the opposite side of the wall 114, there is additional support in the form of triangular gussets 120 (FIG. 9) that are disposed about the perimeter of the piston 40 and extend to support the wall 114.

In operation, the arrester 10 is provided with internal pressure through the end cap 30. The pressure on the back side of the piston 40 is normally set at a level greater than the line pressure inside the water line. When the pressure inside the line spikes due to a water hammer triggering event such as the sudden interruption of flow caused by closing the valve, the water hammer arrester 10 provides a path for the water under pressure. Once inside the arrester 10, the pressurized water works against the pressure of the piston to dissipate the shock from the interruption in flow. Once the line pressure returns to normal, the piston returns to its normal position resulting from the pressurized chamber within the piston.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A water hammer arrester, comprising:
   a hollow plastic body having a first end with a first opening and a second closed end, the second end disposed opposite from the first end;
   a metal fitting having a pipe stub and having an opening disposed in the center of the pipe stub, the fitting attached to the first end such that the opening in the fitting is in registry with the first opening in the plastic body, the plastic body being insert molded to the metal fitting;

a piston having a first end and a second end and being slidable within the body;

wherein a sealed chamber is formed between the second end of the piston and the second closed end of the body.

2. A water hammer arrester, comprising:

a hollow plastic body having a first end with a first opening and a second end with a second opening, the second end disposed opposite from the first end;

a metal fitting having a pipe stub with threads disposed thereon and having an opening disposed in the center of the pipe stub, the fitting attached to the first end such that the opening in the fitting is in registry with the first opening in the plastic body;

a piston having a first end and a second end and being slidable within the body, the piston having a flexible skirt disposed at the first end, the skirt having a sharp edge capable of scraping an inner wall of the plastic body;

an end cap removably attached to the second end of the plastic body; and, wherein a sealed chamber is formed between the second end of the piston and the end cap.

3. A water hammer arrester, comprising:

a hollow plastic body having a first end with a first opening and a second end with a second opening, the second end disposed opposite from the first end;

a metal fitting having a pipe stub with thread disposed thereon and having an opening disposed in the center of the pipe stub, the fitting attached to the first end such that the opening in the fitting is in registry with the first opening in the plastic body, wherein the fitting has at least one annular ring disposed thereon for engagement with the plastic body during molding;

a piston having a first end and a second end and being slidable within the body;

an end cap removably attached to the second end of the plastic body; and, wherein a sealed chamber is formed between the second end of the piston and the end cap.

4. A water hammer arrester, comprising:

a hollow plastic cylindrical body having a first end with a first opening and a second end with a second opening, the second end disposed opposite from the first end;

a metal fitting having a pipe stub with threads disposed thereon and having an opening disposed in the center of the pipe stub; the fitting attached to the first end such that the opening in the fitting is in registry with the first opening in the plastic body;

a piston having a first end and a second end and being slidable within the body, the piston having a flexible skirt disposed at the first end, the flexible skirt have a sharp edge capable of scraping an inside wall of the plastic body;

an end cap removably attached to the second end of the plastic body; and, wherein a sealed chamber is formed between the second end of the piston and the end cap.

5. The water hammer arrestor of claim 4, wherein the plastic body is molded around the metal fitting.

6. The water hammer arrestor of claim 4, wherein the fitting further comprises a set of wrench flats.

7. The water hammer arrestor of claim 4, wherein the plastic body has a set of external threads adjacent the second end.

8. The water hammer arrestor of claim 7, wherein the end cap has a set of internal threads capable of engaging with the threads at the second end of the plastic body.

9. The water hammer arrestor of claim 4, wherein the fitting has at least one annular ring disposed thereon for engagement with the plastic body during molding.

10. The water hammer arrestor of claim 4, wherein the piston carries at least one O-ring for sealing engagement with an inside wall of the plastic body.

11. The water hammer arrestor of claim 4, wherein the end cap further comprises an upstanding cylindrical member.

12. A water hammer arrestor, comprising:

a hollow plastic cylindrical body having a first end with a first opening and a second end with a second opening, the second end disposed opposite from the first end, the cylindrical body having an inner wall and an outer wall, the outer wall having a set of threads disposed thereon and positioned adjacent the second end of the body;

a metal fitting having a pipe stub with threads disposed thereon and having an opening disposed in the center of the pipe stub; the fitting attached to the first end such that the opening in the fitting is in registry with the first opening in the plastic body, the fitting having at least one annular ring disposed thereon for engagement with the plastic body during molding of the body around the fitting;

a piston having a first end and a second end and being slidable within the body, the piston having a flexible skirt disposed at the first end, the flexible skirt have a sharp edge capable of scraping an inside wall of the plastic body, the piston having at least one groove on an outer surface capable of receiving an O-ring for sealing engagement between the O-ring and an inner wall of the plastic body;

an end cap removably attached to the second end of the plastic body, the end cap capable of being sealingly attached to the second end of the plastic body by means of a gasket and having a passageway defined therein for receiving a reaction force medium; and, wherein a sealed chamber is formed between the second end of the piston and the end cap.

13. A water hammer arrester, comprising:

a hollow body having a first end with a first opening and a second closed end, the second end disposed opposite from the first end;

a piston having a first end and a second end and being slidable within the body, the piston having a flexible skirt disposed at the first end, the skirt having a sharp edge capable of scraping an inner wall of the body; and, a pipe stub disposed around the first opening on the hollow body.

14. A water hammer arrester, comprising:

a hollow plastic body having a first end with a first opening and a second closed end, the second end disposed opposite from the first end;

a metal fitting having a pipe stub and having an opening disposed in the center of the pipe stub, the fitting attached to the first end such that the opening in the fitting is in registry with the first opening in the plastic body;

a piston having a first end and a second end and being slidable within the body, the piston having a flexible skirt disposed at the first end, the skirt having a sharp edge capable of scraping an inner wall of the plastic body;

wherein a sealed chamber is formed between the second end of the piston and the end cap.

15. A water hammer arrester, comprising:

a hollow plastic body having a first end with a first opening and a second closed end, the second end disposed opposite from the first end;

a metal fitting having a pipe stub and having an opening disposed in the center of the pipe stub, the fitting attached to the first end such that the opening in the fitting is in registry with the first opening in the plastic body, wherein the fitting has at least one annular ring disposed thereon for engagement with the plastic body during molding;

a piston having a first end and a second end and being slidable within the body;

wherein a sealed chamber is formed between the second end of the piston and the end cap.

* * * * *